United States Patent [19]

Kahonen

[11] Patent Number: 5,161,344
[45] Date of Patent: Nov. 10, 1992

[54] PORTABLE DISPLAY STRUCTURE

[75] Inventor: Hannu Kahonen, Helsinki, Finland

[73] Assignee: Expand International AB, Nacka, Sweden

[21] Appl. No.: 639,938

[22] Filed: Jan. 11, 1991

[30] Foreign Application Priority Data

Jan. 15, 1990 [GB] United Kingdom ............... 9000819
Jan. 15, 1990 [GB] United Kingdom ............... 9000820

[51] Int. Cl.5 ............................................. E04H 12/18
[52] U.S. Cl. ............................................. 52/646; 52/81; 52/648; 52/118; 403/171; 403/176
[58] Field of Search ............... 52/118, 646, 645, 648, 52/81; 403/171, 174, 178, 176

[56] References Cited

U.S. PATENT DOCUMENTS

| 2,697,845 | 12/1954 | Broner . | |
|---|---|---|---|
| 3,521,421 | 1/1968 | Schroeder, Jr. | 52/648 |
| 3,771,274 | 11/1973 | Vaughan | 52/646 |
| 3,914,063 | 10/1975 | Papayoti | 403/171 X |
| 4,557,097 | 12/1985 | Mikulas, Jr. et al. | 52/646 |
| 4,599,832 | 7/1986 | Benton et al. | 52/118 |
| 4,658,560 | 4/1987 | Beaulieu . | |
| 4,761,929 | 8/1988 | Zeigler | 52/646 |
| 4,765,114 | 8/1988 | Wesselski | 52/646 |
| 4,864,795 | 9/1989 | Burg | 52/646 |

FOREIGN PATENT DOCUMENTS

| 0106016 | 8/1982 | European Pat. Off. . |
| 2117196 | 4/1971 | Fed. Rep. of Germany . |
| 2526660 | 6/1975 | Fed. Rep. of Germany . |
| WO84/01094 | 9/1983 | World Int. Prop. O. . |
| WO87/03346 | 11/1986 | World Int. Prop. O. . |

Primary Examiner—Richard E. Chilcot, Jr.
Assistant Examiner—Kien Nguyen
Attorney, Agent, or Firm—Townsend and Townsend

[57] ABSTRACT

A portable display structure comprising a number of upright columns joined by a number of horizontally extending beams, the columns and/or beams being formed in a similar manner of a central structural member made of a number of units and each unit comprising a plurality of rod elements connected at their ends to associated hubs.

28 Claims, 10 Drawing Sheets

PORTABLE DISPLAY STRUCTURE

This invention relates to a portable display structure.

BACKGROUND TO THE INVENTION

In the past, temporary or semi-permanent structures for interior decoration and exhibition stands and the like have been assembled from collapsible or demountable supporting structures which comprise a plurality of rod elements connected at their ends to associated hubs, at least some of the hubs being located in the corners of rectangular or square sections when the supporting structure is erected. Such structures have been used to assemble panels from which temporary portable structures can be built up but such structures have not been used in the form of columns or beams.

The invention aims to provide a structure formed of columns and beams where the columns and/or beams are assembled from readily transportable components.

BRIEF SUMMARY OF THE INVENTION

According to the invention there is provided a portable display structure comprising a number of upright columns joined by a number of horizontally extending beams, the columns and/or beams being formed in a similar manner of a central structural member made of a number of units and each unit comprising a plurality of rod elements connected at their ends to associated hubs, at least some of the hubs being located in the corners of rectangular, eg square, sections when the units are erected, the units being transportable in a flat configuration, the structural member when in its erected position defining a longitudinally extending unit having a cross section corresponding to the said rectangular section, in which the column and beams are joined to nodes of rectangular parallelopiped shape, the columns and beams extending out from the faces of the nodes, and in which each face of a node forms the end of a column and/or beam and is in the form of a rigid member which assists in holding the respective central structural member in its erected position.

According to a preferred embodiment the faces of the nodes are formed of separate frames which can be joined to one another to assemble a node after the respective frame has been joined to the end of its associated column or beam.

The use of the central structural members made up of the hinged rod elements enables one very quickly to assemble and disassemble the overall structure and to make, when assembled, a rigid framework for the column or beam.

According to one embodiment of the invention the rigid members, which are joined to the ends of a central structural member at one, or preferably both, ends to hold the structure in its erected position, are tie members which join pairs of adjacent corners of the hubs corresponding to the rectangular section. Generally these members will be in the form of ties capable of resisting tension rather than compression since the forces tending to move the erected structural member from that erected position to its flattened position are forces which tend to move the hubs further apart from one another and so increase the rectangular cross section of the resulting structure.

The central structural member can be made up of a number of units. In its simplest form there may be only one unit but to make longer columns or beams a number of units may be assembled end to end. It is possible to assemble these units by joining individual units together but preferably the central structural member is made up permanently of an integral number of units, eg 2, 3, 4, 5 or more, where the hubs which are common to the ends of two adjacent units where two units join are common hubs and the rod elements are hinged to the common hubs about common pivot points.

In one preferred embodiment of the invention each central structural unit is composed of eight identical rod elements. The rod elements are hinged to one another in pairs at a central location along their lengths and then at the ends other pairs of rods are hinged to one another at pivot points which are at right angles to one another and which correspond to the hubs. Such a structure forms a beam of square cross section at the hub members and the overall envelope encompassed by the eight rod members is of approximately that constant square cross section.

Preferably each hub is provided with snap fit means which will engage with corresponding means on hub covers. The latter, after engagement with the hubs, define peg receiving means and the corner clamps have openings to receive the heads of pegs which join and lock a frame to the end of a unit. In this way a quick and simple arrangement is provided for joining the frame to the ends of the units.

The snap fit means can for example comprise a pair of resiliently spaced lugs extending outwardly from each hub, these lugs having detents inwardly directed towards one another at the ends of the lugs. Corresponding lugs are provided on the hub covers with outwardly directed detents which engage with, and are a snap fit with, the detents on the lugs on the hubs. The direction of the detents could be reversed. In this way the hub covers can be quickly and simply pressed in a snap fit fashion into engagement with the hubs.

According to an embodiment of the invention, the rigid frames comprise corner clamps which can be quickly and detachably fitted to the hubs of a beam or column and a rigid frame member to the corners of which the clamps are attached. Preferably the clamps have means for releasably attaching one clamp to another, the joining of a clamp of one rigid frame joining to a clamp of another, assembling the frames to provide the nodes. These means can comprise a pair of spaced ring members on one clamp and a hook on an adjacent clamp capable of being received between the pair of ring members, and pin means passing through the pair of ring members for securing the hook in place between the pair of ring members.

Alternatively or additionally the central structural member can be held in its erected position by longitudinally extending corner members. This is particularly in the case of columns. These members can have snap fit means joining with the snap fit means of the hubs, these members being provided at their ends and, in the case of a central structural member made of a plurality of units, at intermediate positions corresponding to hubs of the structural members, with cut-outs in which the hubs are engaged to locate the hubs lengthwise and so assist in holding the central structural member in the erected position. Additionally these members have integral flanges extending away from a respective hub in the direction of the said rectangular section to define a number of flat planes corresponding to the said rectangular section so that flat side panels can be adhered to the flanges to clothe the panel so that the rod elements are hidden.

Accordingly, the invention in another aspect aims to provide a form of column or beam which can be assembled from readily transportable components to provide a covered structure simulating a solid column or beam.

According to the another aspect of the invention there is provided a central structural member made of a number of units each comprising a plurality of rod elements connected at their ends to associated hubs, at least some of the hubs being located in the corners of rectangular, eg square, sections when the units are erected, the units being transportable in a flat configuration, the structural member when in its erected position defining a longitudinally extending beam having a cross section corresponding to the said rectangular section, and in which at the hubs are provided snap fit means which engage with corresponding means on longitudinally extending corner members to enable the corner members to be quickly mounted onto the hubs, the corner members having integral flanges extending away from a respective hub in the direction of the said rectangular section so that pairs of flanges define a number of flat planes corresponding to the said rectangular section so that side panels can be adhered to the flanges to clothe the column so that the rod elements are hidden.

An important advantage of such an arrangement is that the snap fit means enables the corner members to fit accurately onto the central structural members. Therefore accurate rectangular, in particular square, cross sections can be defined since the corner numbers will then be precisely located and this, together with the side panels, will give a good simulation of a solid column or beam. This would not be the case if the corner members were for example simply clipped onto the bars in the lattice work girder members of the prior art since an accurate rectangular plane would not then be defined for the side panels.

Also the use of the central structural members made up of the hinged rod elements enables one very quickly to assemble and disassemble the overall structure and to make, when assembled, a rigid framework for the column or beam.

According to one embodiment of the invention it is desirable that the central structural member be provided with the said rigid means at one, or preferably both, ends to hold the structure in its erected position.

The snap fit means can for example comprise a pair of resiliently spaced lugs extending outwardly from each hub, these lugs having detents inwardly directed towards one another at the ends of the lugs. Corresponding lugs are provided on the longitudinally extending corner members with outwardly directed detents which engage with, and are a snap fit with, the detents on the lugs on the hubs. The directions of the detents could be reversed. In this way the corner members can be quickly and simply pressed in a snap fit fashion into engagement with the hubs to assemble the four longitudinally extending corners of the column or beam. Preferably the corner members are in the form of lightweight extrusions, eg of light metal such as aluminum or a synthetic plastics material, where the lugs and the flanges are all integrally formed.

Desirably the corner members have an overall length corresponding to the eventual length of the column or beam. The corner member may additionally have integral extensions joined to the lugs which project into contact with the edges of the hubs but are cut-away in regions aligned with the hubs so as to accommodate the hubs. In this way the location of the corner members longitudinally along the length of the column or beam can be assured and in addition the corner member will also help to support the hub members and therefore help to maintain the shape of the central structural member in the erected position.

The side panels of the resulting column or beam can be adhered to the integral flanges on the corner members in any convenient fashion. One convenient method is to use double sided adhesive tape to secure the edges of the panel to the flanges. More preferably, however magnetic strips are provided on the flanges which engage with corresponding magnetic or magnetically attractable strips on the rear of the panels. This latter embodiment has particular advantages in enabling quick assembly and disassembly.

The integral flanges on the longitudinal extending corner members can meet to provide a clean corner. Preferably however they do not and between them at the corner is provided an opening into which fittings such as light fittings can be temporarily fixed. Also the resulting openings can accommodate electrical leads and the like and, to provide an overall neat finish, a resilient covering strip can be inserted to cover and mask any such leads and to provide a clean corner.

DESCRIPTION OF THE DRAWINGS

The invention will now be described, by way of example, with reference to the accompanying drawings, in which.

DESCRIPTION OF THE PREFERRED EMBODIMENT

Figure 2:
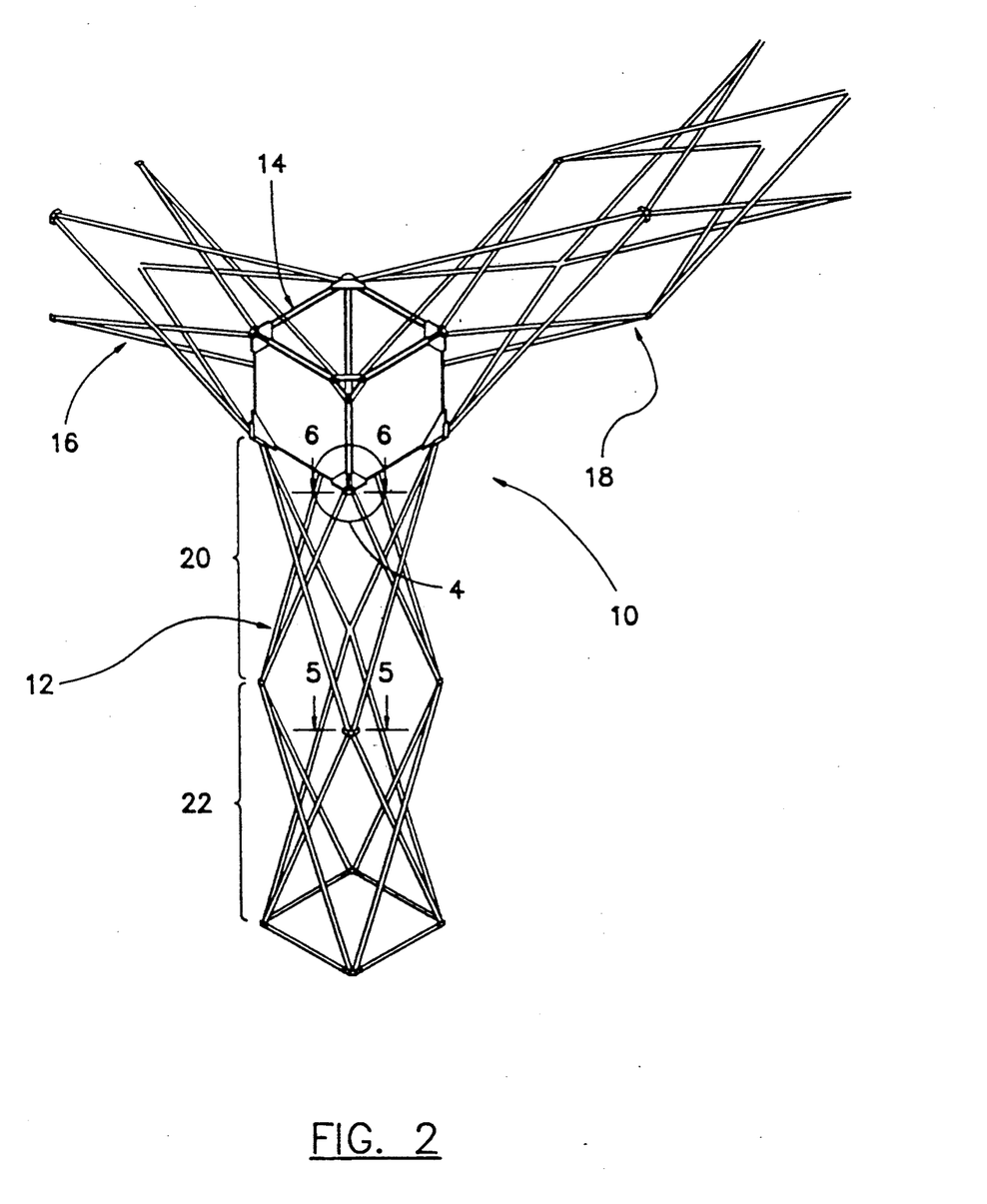
FIG. 2 is a view showing a number of units assembled together to form a structure according to the invention.

Referring to the drawings and more particularly FIG. 2, this shows a number of columns and beams assembled to form a structure 10 according to the invention. By way of example there is shown an upright column 12 joined by means of a square corner box unit 14 to horizontally extending beams 16 and 18 of the same construction as the column 12. There may be any number of columns and beams and in general where the columns and/or beams join, they are joined by a box unit 14.

The column or columns and the beam or beams are substantially identical and are made up of a number of basic structural units. By way of example, the column 12 is made of two structural units 20 and 22. Each structural unit can move between the assembled condition showed in FIG. 2 and a flattened transportable condition shown in FIG. 1.

Figure 1:
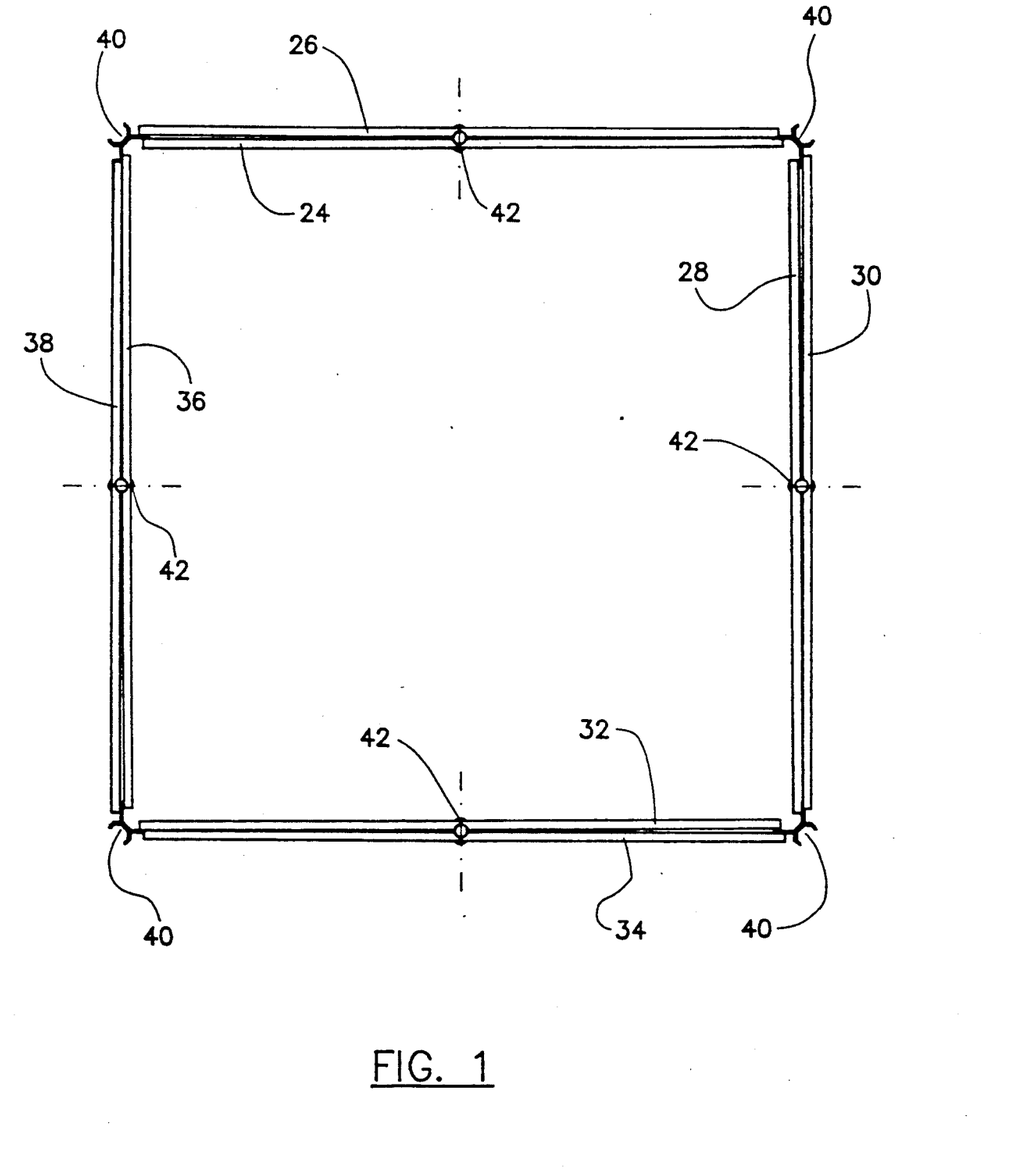
FIG. 1 is a view showing one unit of the central structural member in its flat transportable configuration.
Figure 3:
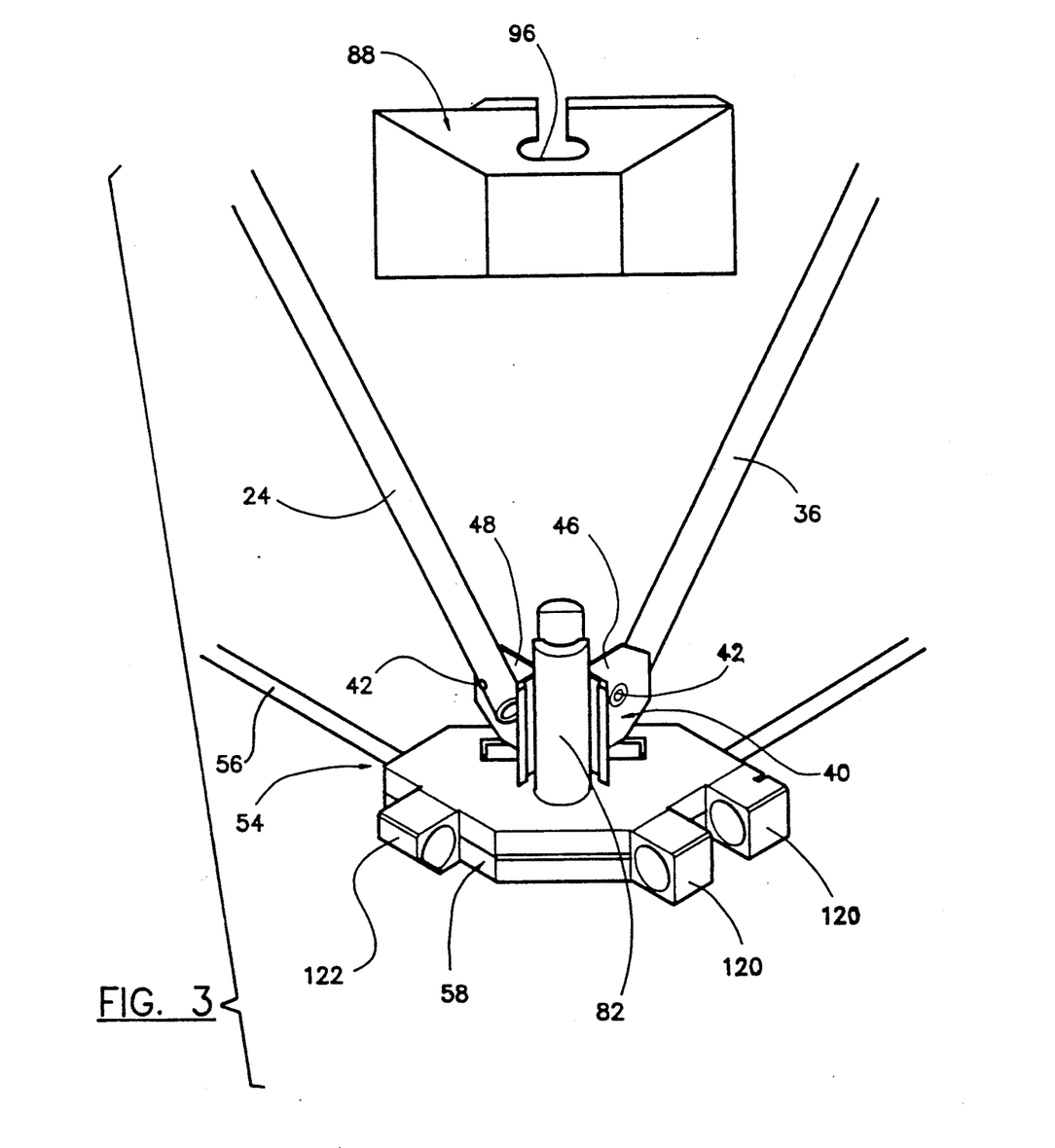
FIG. 3 is an enlarged diagram showing the assembly of parts at a bottom corner of the column shown in FIG. 2.

As best shown in FIGS. 1 and 2, each unit 20 or 22 is composed of eight rods 24 to 38. These are hinged in pairs to corner hubs 40 and are hinged to those hubs by means of pivot pins 42 [see FIGS. 3 and 6). Also a pair of rods, eg the rods 24 and 26, the rods 28 and 30, and so on, extending along one side of the square as shown in FIG. 1 are also hinged to one another at a central position along their lengths by means of pivot pins 42.

Figure 5:
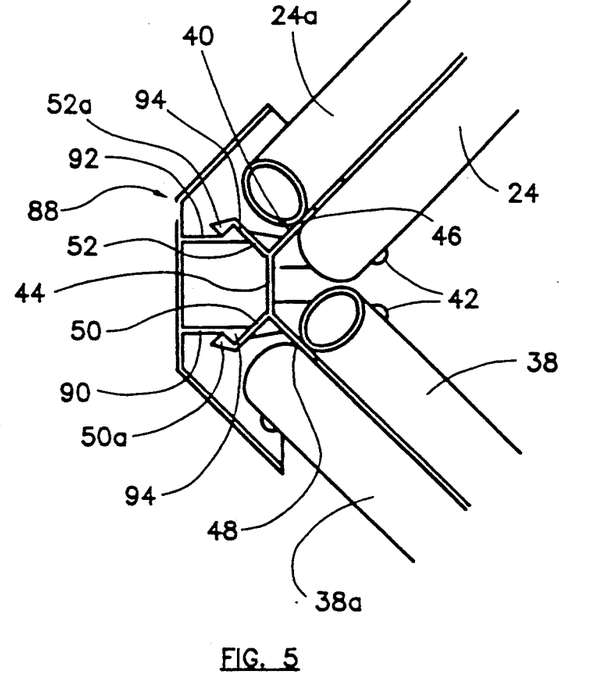
FIG. 5 is an enlarged section taken on the line 5—5 of FIG. 2.

As best seen in FIG. 5, each hub 40 comprises a main body 44 with a pair of integrally formed arms 46 and 48. These are positioned at right angles to one another and to each of these a respective pivot pin 42 and a respective rod 24 to 38 is joined. Also integrally joined to the main body 44 are a pair of outwardly projecting lugs 50 and 52. These have inwardly projecting detents 50a and 52a and the lugs have sufficient inherent resiliency to enable them to be a snap fit with other components as will be described.

In the arrangement shown in FIG. 1 there is only a single unit 20 or 22 but as seen in FIG. 2 a pair of such units 20 and 22 are joined to one another. In such a case two rods, one from each unit, are hinged to each of the arms 46 and 48 about a respective pivot pin 42, see for example FIG. 5, where the rods referenced 24 and 24a are joined to the arm 46 about a common pivot pin 42 and the two rods referenced 38 and 38a are joined to the arm 48 about a common pivot pin 42.

To retain the column 12 or the beams 16 and 18 in their assembled conditions as shown in FIG. 2, their ends are joined to a square frame 54 which forms part of the square corner box unit 14.

Each square frame 54 is composed of a square tie member 56 and four corner clamps 58. In the case of the top and bottom of the column 12 the tie member is an endless metal band having four substantially straight sides 60 joined by an angled corner 62 (see FIG. 7). As an alternative and as shown in FIG. 7, the tie member could be in the form of a flat square metal plate 63 and at the corners of this plate are four cut-outs 63a and angled corners 63b which simulate the angled corners 62 and so fit the clamps 58 as will be described.

Figure 7:
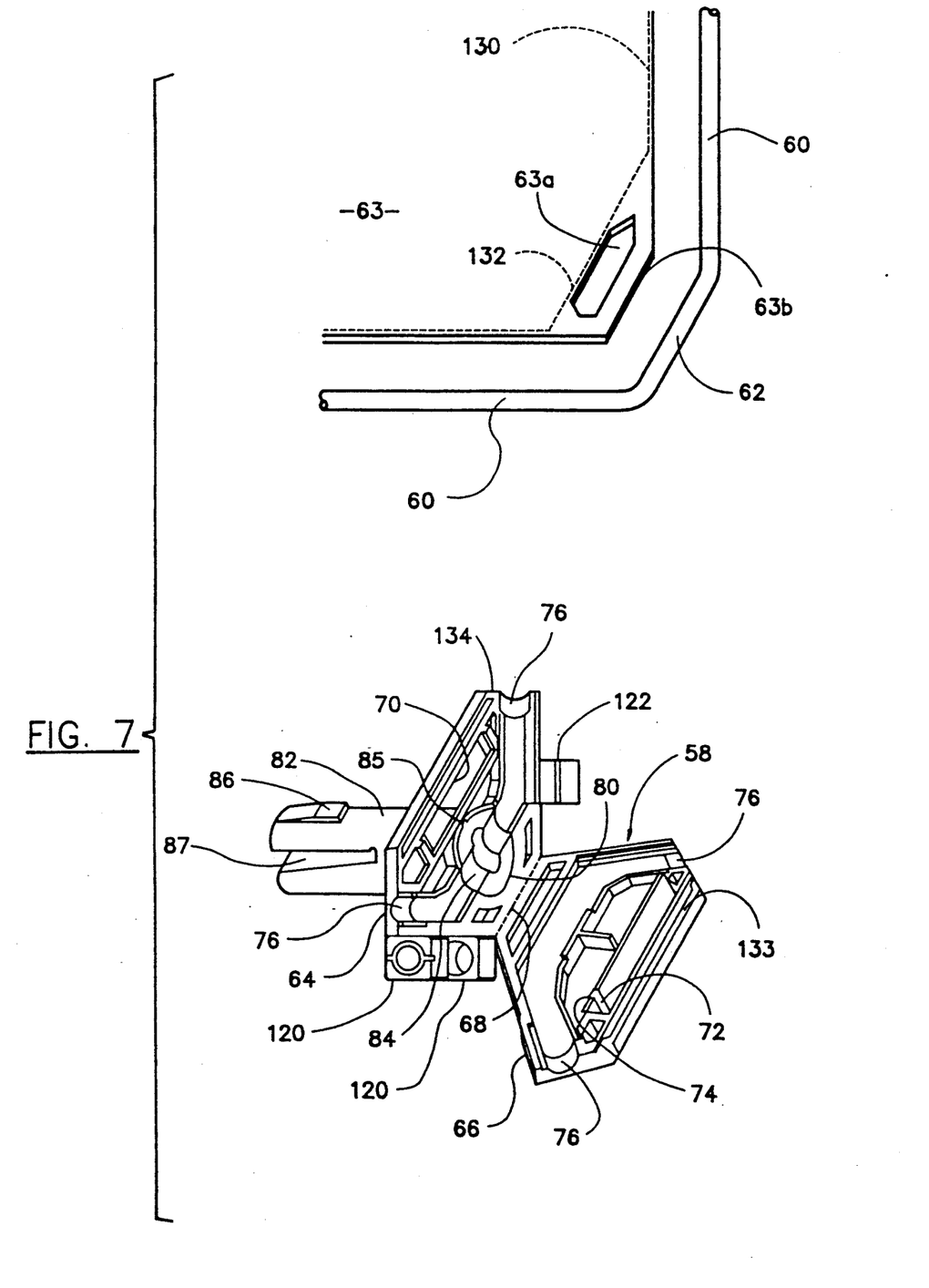
FIG. 7 is a detail diagram showing the way in which a clamp is attached.
Figure 8:
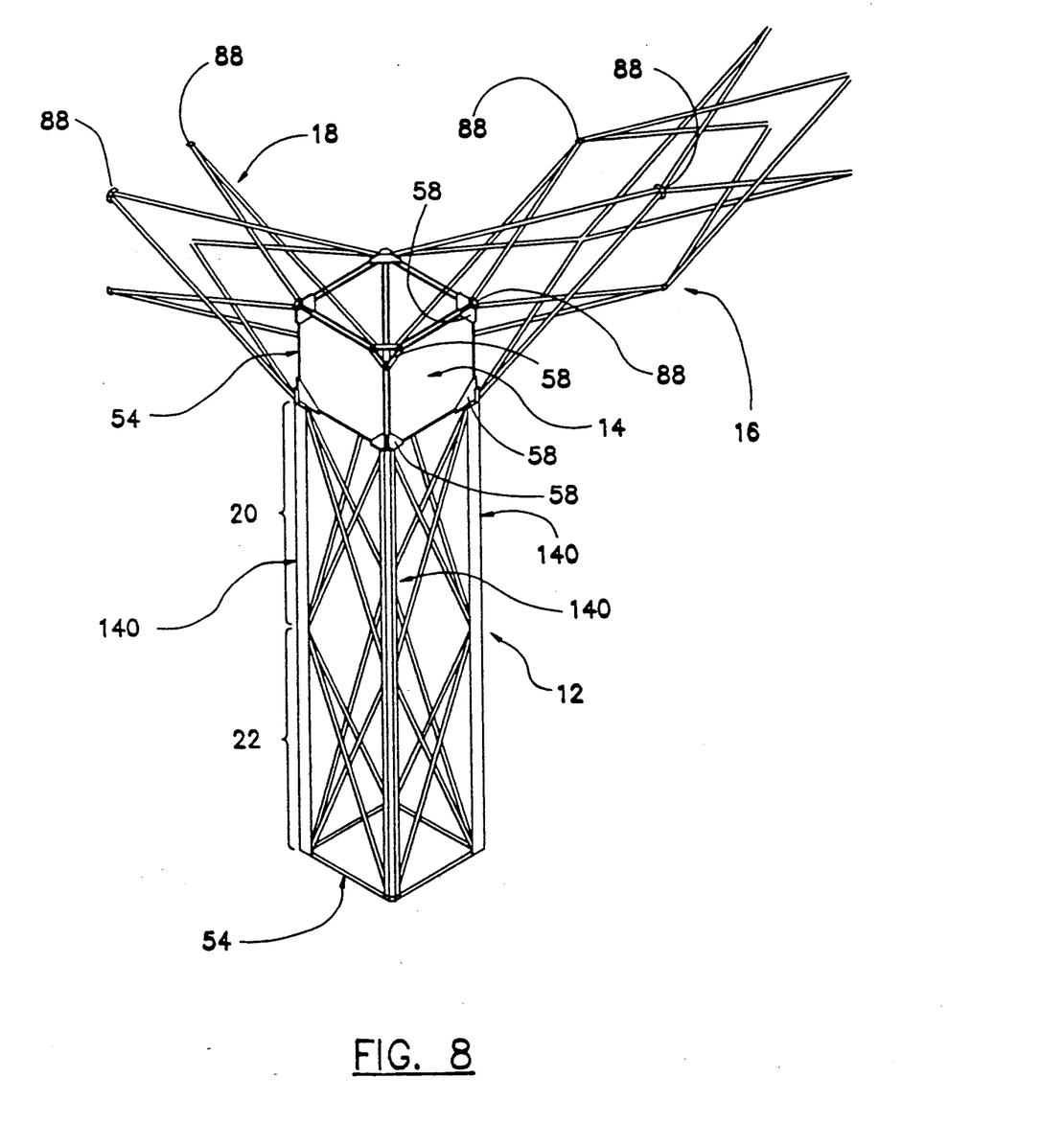
FIG. 8 is a view similar to FIG. 2 but showing the first step in the covering of a column to simulate a solid column.

FIG. 7 shows one of the clamps 58 in its open position. It can then receive the angled corners 62 or 63b. Each clamp comprises a plastics moulding integrally formed in two parts 64 and 66 and joined by means of a plastics hinge 68. The parts 64 and 66 can be pressed towards one another and the part 64 includes a cut-out or opening 70 whilst the other part 66 includes an inwardly projecting lug 72 having a detent 74. When the two parts are pressed towards one another, the lug 72 enters the cut-out 70 and the detent 74 is a snap fit behind the cut-out so as to hold the clamp in its closed configuration. Each part 64 or 66 includes a recess 76 shaped to accommodate an angled corner 62 or 63b. Thus when the two parts 64 and 66 are closed, the tie member 56 will be trapped in and engaged in those recesses 76.

Also the part 64 has a hole in which is received the head 80 of a peg 82. The head 80 includes a recess 84 aligned with the recess 76. At its edge the head has a small notch 85 which fits with a corresponding recess in the part 64 to ensure the correct orientation of the peg 82. The body of the peg 82 also includes a detent 86 and a V-shaped cut-out 87 to allow the detent 86 to be a snap fit with the main body 44 of a hub 40 as will be described.

As best shown in FIGS. 3 to 6, each corner hub 40 is provided with a hub cover 88. Each of these has integrally formed inwardly extending arms 90 and 92 which each have outwardly extending detents 94 at their ends. These arms are a snap fit with the lugs 50 and 52 on the hubs. Also the covers 88 have circular openings 96 to receive the main body of a peg 82.

Figure 6:
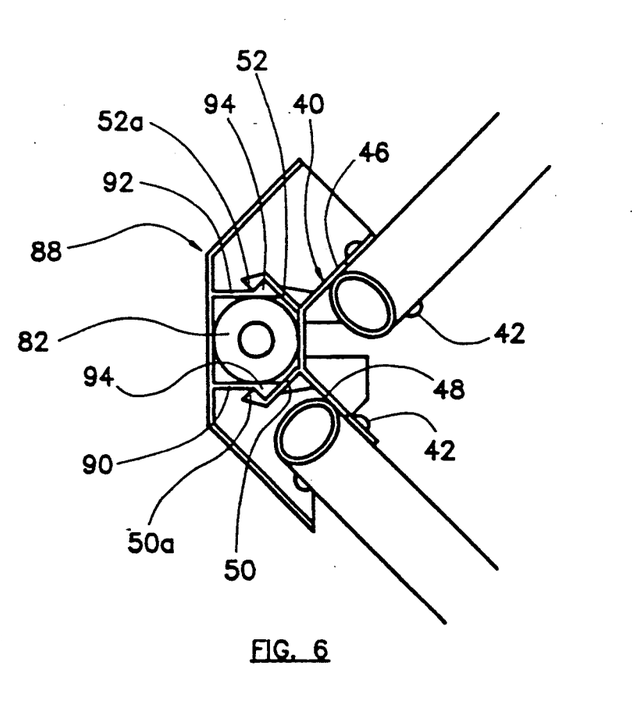
FIG. 6 is a section taken on the line 6—6 of FIG. 2.

As best seen in FIGS. 5 and 6, when a hub cover 88 has been fitted to a hub, a roughly circular opening is defined between the main body 44 and lugs 50 and 52 of the hub, and the main body and arms 90 and 92 of the cover. The circular peg 82 can be received tightly in that opening to locate it and in addition the detent 86 will snap out behind the extremity of the main body 44 into a small cut away portion not shown, so enabling the pegs 82 to connect with the hubs at the end of a column 12 or beam 16 or 18.

The square frame 54 at each end of the column will then also act as a tie member holding the four hubs 40 in the square cross-sectional shape of the column or beam and will resist attempts by the column to move to its flattened position shown in FIG. 1.

The column 12 and the beams 16 and 18 are joined to one another by a square corner box unit 14. Each unit is formed of six faces which are basically all formed identically and are square frames 54 joined as will be described. These frames can be formed with the tie members 56 in the form of a metal band or using a metal plate 62 as described above and shown in FIG. 7.

Figure 4:
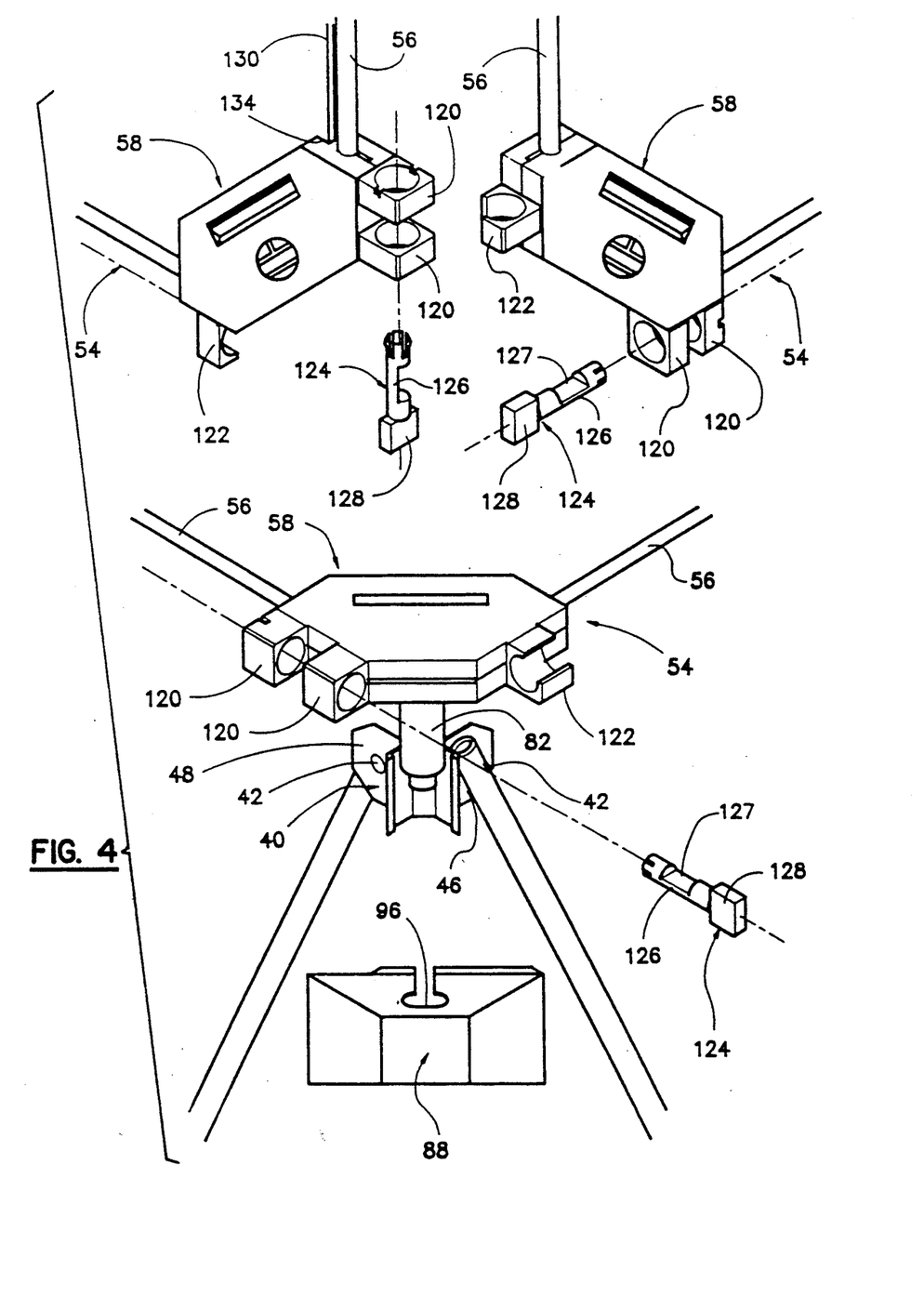
FIG. 4 is an enlarged exploded detail of the region circled and marked 4 in FIG. 2.

As best seen in FIG. 4, each clamp 58 also includes a pair of squared rings 120 projecting from one side and a single corresponding incomplete ring or hook 122 from a side at right angles. The positioning and sizing of these rings is such that the single ring 122 on one clamp can be received between the pair of rings 120 of an adjacent clamp when these clamps are to be joined.

The clamps are joined to assemble the square corner boxes by means of pins 124. These pins are inserted through the pair of rings 120 and the incomplete ring 122 can then be hooked over the body 126 of the pin 124. As shown in FIG. 4, each body 126 has a flattened portion 127 which in one orientation allows the incomplete ring 122 to pass over the body and then when the head 128 of a pin is turned this will trap the ring 122 in place, so securing one clamp 54 to another. Also the squared outer shape of the rings 120 and 122 ensures that the two clamps are held by a pin 124 at right angles to one another.

In this way one can build a corner box unit 14 by simply locking the rings 122 of one clamp over the body 126 of a pin in an adjacent clamp and thereafter twisting the pin 124 to lock the two clamps to one another. In particular, once three clamps have been joined at a corner of the box unit 14, the structure becomes quite rigid and the completion of a six-sided body unit provides a very rigid structure to which the column 12 and beams 16 and 18 are joined.

Where a square frame 54 is provided with a tie member 56 in the form of a metal band it may additionally be desirable to close the face of that frame. This can be achieved using a plastics sheet 130, a portion of which is shown in broken lines in FIG. 7 and full lines at the top of FIG. 4. This has cut away angled corners 132, the parts 64 and 66 of each clamp 58 have recesses 134 at their mating inwardly directed edges and the corners 132 will fit into those recesses 134 to hold and trap the sheet 130 in place in the center of the frame.

As an alternative the column 12 can be made to simulate a column of solid construction. In such a case the hub covers 88 are not used and instead the upright edges of the column 12 are provided with extrusions 140. The construction of such a column is illustrated in FIGS. 8 to 12.

The extrusions 140 have a main body 142 of outwardly open box-shape providing an opening 144 and a pair of integrally formed inwardly extending spaced arms 146 and 148. These arms have integral outwardly directed detents 150 and these detents engage with and are a snap fit with the lugs 50 and 52 and corresponding detents 50a and 52a of a hub 40. When so engaged with one another, the arms 146 and 148 and lugs 50 and 52 define a roughly circular opening into which the body of a peg 82 can be received. Also a rearwardly extending thickening 152 on the body 142 helps to define that circular opening. As a result a square frame 54 can be attached to the ends of a column 12 by pressing the four pegs 82 at the corners of the frame 54 these circular openings and the body of the pegs 82 will enter the openings and eventually the detents 84 will snap out behind the extremity of the main body 44 of a respective hub 40 and lock the square frame 54 to the end of a column.

Each extrusion 140 also extends the total height of the column and is of substantially constant section. It includes a pair of arms 154 and 156 extending at right angles to one another and which define the square shape of the column. These arms 154 and 156 are integrally formed with the main body 142.

Figure 12:
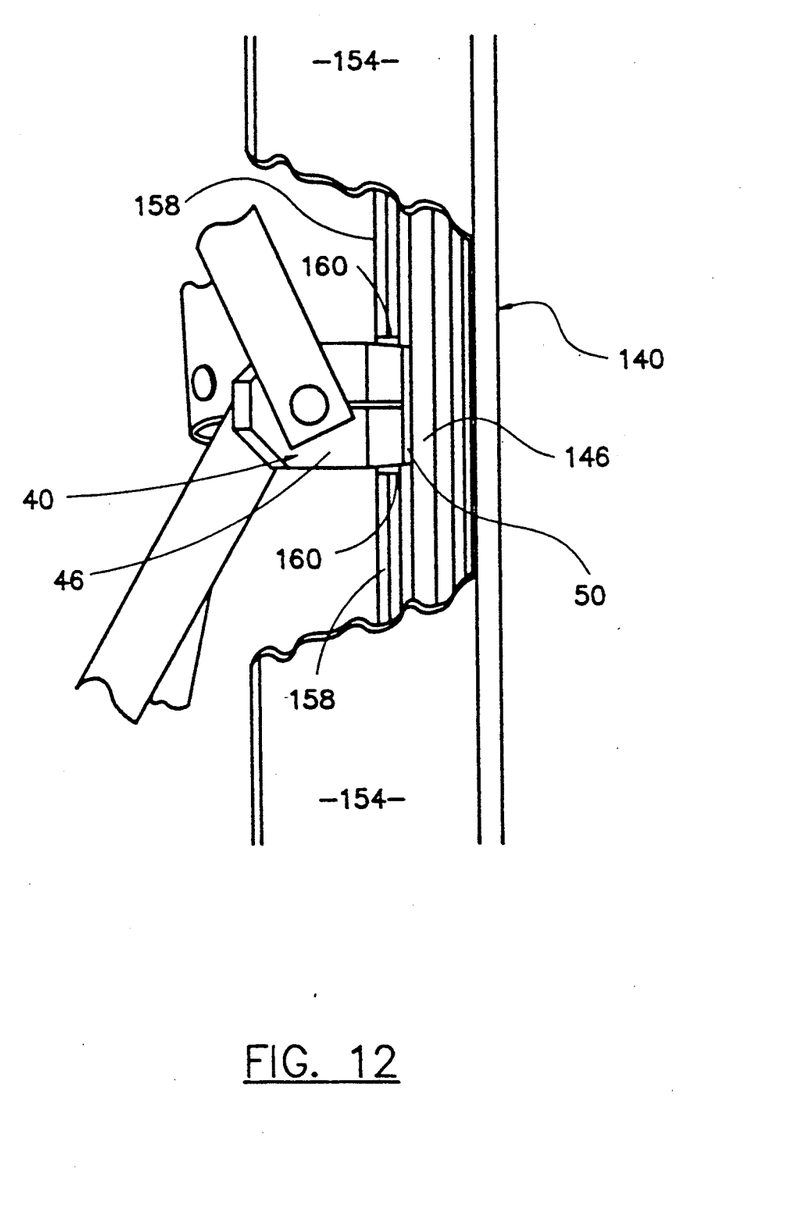
FIG. 12 is an enlarged broken away detail taken in the region circled and marked 12 in FIG. 9.

Also the arms 144 and 146 include extensions 158 (see FIG. 12). These are cut away at the extremities and also at central locations at the points 160 corresponding to hubs 40. The cut portions are of such a size that the arms 46 and 48 on the hubs 40 are received in the cut-away portions. The extensions 158, therefore, engage with the arms 46 and 48 and assist in strengthening the overall column longitudinally so as to keep its overall length substantially constant.

In order to join side panels 162 to the column, each arm 154 and 156 is provided with some form of adhesive member. This could, for example be double-sided adhesive tape and then the panels 162 stuck to the arms by the adhesive tape. In a preferred embodiment shown in FIGS. 10 and 11, however, magnetic strips 164 are permanently attached by means of an adhesive to the arms 154 and 156 and then the panels 162 are provided with corresponding magnetic strips which can be quickly and temporarily adhered to one another to hold the side panels 162 in place.

Figure 9:
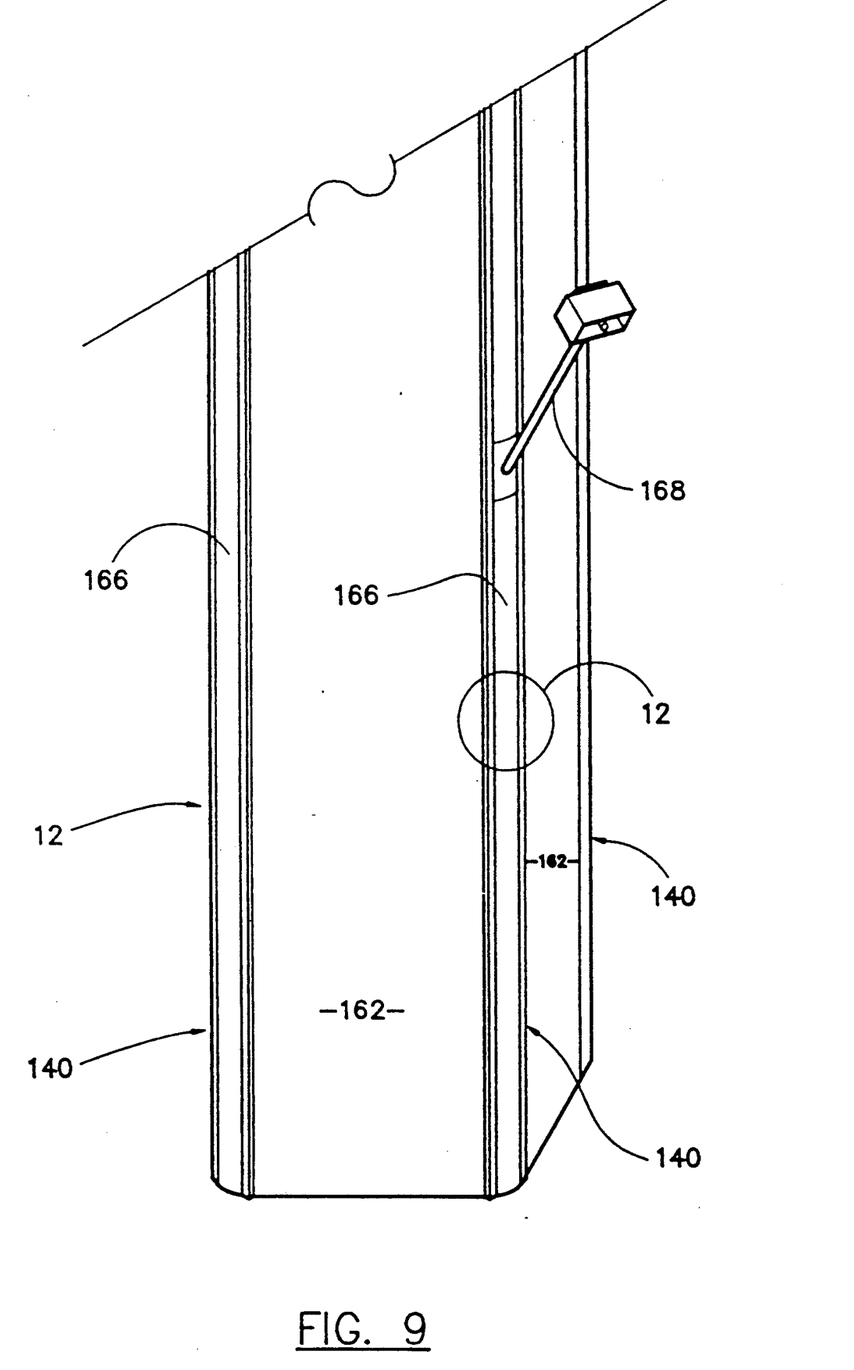
FIG. 9 is a detail view of part of a completed column.
Figure 10:
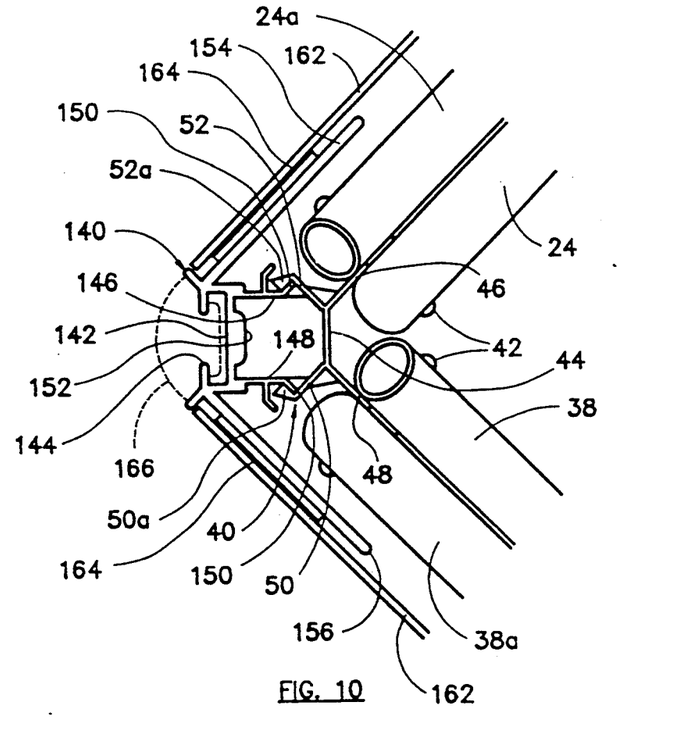
FIG. 10 is a section similar to FIG. 5 but showing the completed column of FIG. 9.
Figure 11:
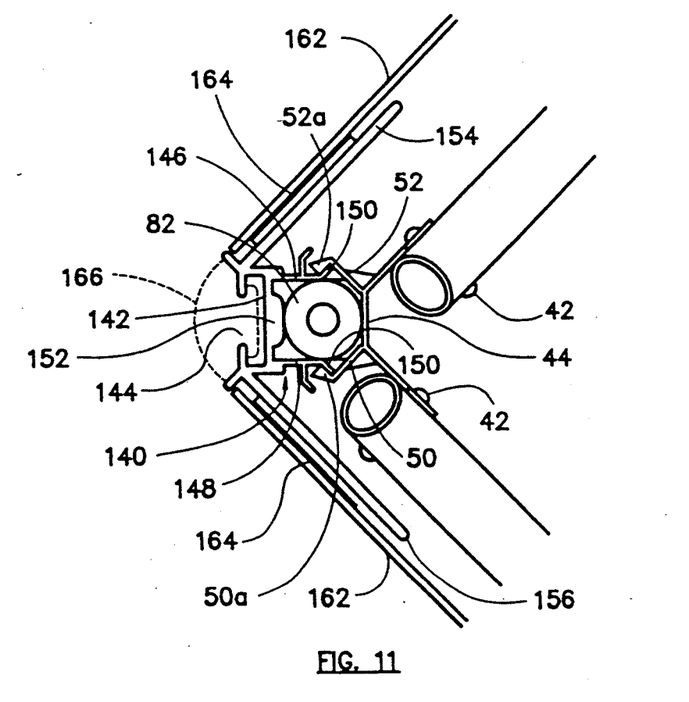
FIG. 11 is a section similar to FIG. 6 but showing the completed column of FIG. 9.

As best shown in FIGS. 10 and 11, the opening 144 in the main body 142 of the extrusion 140 can be filled with a soft rubber strip 166 so as to provide a neat corner. This strip may be cut away at places where required to provide for the support of, for example, a lamp 168 as shown in FIG. 9. The lamp is itself provided with arms (not shown) which engage within the opening 144 to hold the lamp and any electrical leads associated therewith can also be accommodated in that upright opening 144 behind the strip 166.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:
1. A portable display structure comprising:
a number of upright columns;
a number of horizontally extending beams joining said upright columns to form said display structure;
the columns and beams being formed in a similar manner and comprising a central structural member made of a number of units, each unit comprising a plurality of rod elements having ends, and associated hubs to which the rod ends are connected, at least some of the hubs being located in corners of rectangular sections when the units are erected, the units being transportable in a flat configuration, the structural member when in its erected position defining a longitudinally extending unit having a cross section corresponding to the said rectangular section and at each end having an end face;
nodes of rectangular parallelopiped shape defined by the columns and beams where they join, the columns and beams extending away from the nodes, said end face of a column or beam of said upright columns and horizontally extending beams forming a face of said nodes, said end face being in the form of a rigid member which assists in holding the respective central structural member in its erected position, and said end faces forming said faces of said nodes being formed of separate frames which can be joined to one another to assemble a node after the respective frame has been joined to the end of its associated column or beam.

2. A structure according to claim 1 in which said rigid members are tie members which join pairs of adjacent corners of the hubs corresponding to the rectangular section.

3. A structure according to claim 1 in which the central structural member of at least one column or beam is made up of one unit.

4. A structure according to claim 1 in which the central structural member of at least one column or beam is made up of a plurality of units assembled end to end, where the hubs which are common to the ends of two adjacent units where two units join are common hubs and the rod elements are hinged to the common hubs about common pivot points.

5. A structure according to claim 1 in which each central structural unit is composed of eight identical rod elements, the rod elements being hinged to one another in pairs at a central location along their lengths and then at the ends other pairs of rods are hinged to one another at pivot points which are at right angles to one another and which correspond to the hubs.

6. A structure according to claim 1 in which the central structural member is adapted to be held in its erected position by longitudinally extending corner members having snap fit means joining with the snap fit means of the hubs, and the corner members being provided at their ends and, in the case of a central structural member made of a plurality of units, at intermediate positions corresponding to hubs of the structural members, with cut-outs in which the hubs are engaged to locate the hubs lengthwise and so assist in holding the central structural member in the erected position.

7. A structure according to claim 6 in which these corner members have integral flanges each extending away from a respective hub in the direction of an edge of the said rectangular section to define a number of flat planes corresponding to the edges of the said rectangular section so that flat side panels can be adhered to the flanges to clothe the panel so that the rod elements are hidden.

8. A structural member for a portable display system comprising:

a number of units, each unit comprising a plurality of rod elements having ends and associated hubs to which the rod ends are connected, at least some of the hubs being located in corners of rectangular sections when the units are erected, the units being transportable in a flat configuration, the structural member when in its erected position defining a longitudinally extending beam having a cross section corresponding to the said rectangular section and having ends;

means at the hubs for engaging with corresponding means on longitudinally extending corner members to enable the corner members to be quickly mounted and demounted onto the hubs, said corner members having integral flanges each extending away from a respective hub in a direction of an edge of the said rectangular section, the flanges defining a number of flat planes corresponding to the edges of the said rectangular section, side panels adhering to said flanges to clothe the column so that the rod elements are hidden, tie members joining pairs of adjacent corners of the hubs corresponding to the rectangular section at at least one end of said beam to hold the beam in its erected position, and cut-outs provided at the ends of the longitudinally extending corner members at intermediate positions corresponding to hubs of the structural members in the longitudinally extending corner members, the hubs engaging said cut-outs, the engagement of the hubs in said cut-outs fixing and holding the units lengthwise in their erected position.

9. A member according to claim 8 wherein the means for mounting and demounting the corner members are snap fit means.

10. A member according to claim 8 in which, between the integral flanges on the longitudinal extending corner members, an opening is formed for receiving and temporarily fixing fittings, a resilient covering strip being inserted to provide a clean corner.

11. A member according to claim 8 in which the central structural member of at least one column or beam is made up of one unit.

12. A member according to claim 8 in which the central structural member of at least one column or beam is made up of a plurality of units assembled end to end, where the hubs which are common to the ends of two adjacent units were two units join are common hubs and the rod elements are hinged to the common hubs about common pivot points.

13. A member according to claim 8 in which each central structural unit is composed of eight identical rod elements, the rod elements being hinged to one another in pairs at a central location along their lengths and then at the ends other pairs of rods are hinged to one another at pivot points which are at right angles to one another and which correspond to the hubs.

14. A member according to claim 8 including longitudinally extending corner members having snap fit means joining with the snap fit means of the hubs for holding the central structural member in its erected position, and the corner members being provided at their ends and, in the case of a central structural member made of a plurality of units, at intermediate positions corresponding to hubs of the structural members, with cut-outs in which the hubs are engaged to locate the hubs lengthwise and so assist in holding the central structural member in the erected position.

15. A member according to claim 14 wherein the corner members have integral flanges each extending away from a respective hub in the direction of an edge of the said rectangular section to define a number of flat planes corresponding to the edges of the said rectangular section so that flat side panels can be adhered to the flanges to clothe the panel so that the rod elements are hidden.

16. A structural member for a portable display system comprising:

a number of units, each unit comprising a plurality of rod elements having ends and associated hubs to which the ends are connected, at least some of the hubs being located in corners of rectangular sections when the units are erected, the units being transportable in a flat configuration, a structural member defining a longitudinally extending beam when in its erected position and having a cross section corresponding to the said rectangular section and having ends, snap fit means provided at the hubs engaging with corresponding means on longitudinally extending corner members to enable the corner members to be quickly mounted and demounted onto the hubs, said corner members having integral flanges each extending away from a respective hub in a direction of an edge of the said rectangular section, the flanges defining a number of flat planes corresponding to the edges of said rectangular section, side panels adhered to said flanges to clothe the column so that the rod elements are hidden, tie members which join pairs of adjacent corners of the hubs corresponding to the rectangular section at at least one end of said beam to hold the beam in its erected position, and wherein said snap fit means comprise a pair of resiliently spaced lugs extending outwardly from each hub, the lugs having detents at the ends of the lugs, corresponding lugs being provided on the longitudinally extending corner members with the detents on the lugs on the hubs.

17. A member according to claim 16 in which the corner members are in the form of lightweight extrusions where the lugs and the flanges are all integrally formed.

18. A member according to claim 16 in which the corner members have an overall length corresponding to the eventual length of the column or beam, the corner member additionally having integral extensions joined to the lugs which project into contact with the edges of the hubs but are cut-away in regions aligned with the hubs so as to accommodate the hubs to help to support the hub members and therefore help to maintain the shape of the structural member in the erected position.

19. A structural member for a portable display system comprising:
   a number of units, each unit comprising a plurality of rod elements having ends and associated hubs to which the ends are connected, at least some of the hubs being located in corners of rectangular sections when the units are erected, the units being transportable in a flat configuration, the structural member when in its erected position defining a longitudinally extending beam having a cross section corresponding to the said rectangular section and having ends,
   the hubs including means engaging corresponding means on longitudinally extending corner members to enable the corner members to be quickly mounted and demounted onto the hubs,
   said corner members having integral flanges each extending away from a respective hub in a direction of an edge of the said rectangular section, the flanges defining a number of flat planes corresponding to the edges of the said rectangular section,
   side panels being adhered to said flanges to clothe the column so that the rod elements are hidden,
   tie members which join pairs of adjacent corners of the hubs corresponding to the rectangular section at at least one or both ends of said beam to hold the beam in its erected position, and
   the side panels being adhered to the integral flanges on the corner members with magnetic strips on the flanges which engage corresponding magnetically attractable strips on the rear of the panels.

20. A portable display structure comprising:
   a number of upright columns,
   a number of horizontally extending beams joining said upright columns to form said display structure;
   the columns and beams being formed in a similar manner and comprising a central structural member made of a number of units, each unit comprising a plurality of rod elements having ends, and associated hubs to which the rod ends are connected, at least some of the hubs being located in corners of rectangular sections when the units are erected, the units being transportable in a flat configuration, the structural member when in its erected position defining a longitudinally extending unit having a cross section corresponding to the said rectangular section and at each end having an end face,
   nodes of rectangular parallelopiped shape defined by the columns and beams where they join, the columns and beams extending away from the nodes, said end face of a column or beam of said upright columns and horizontally extending beams forming a face of said nodes, said end face being in the form of a rigid member which assists in holding the respective central structural member in its erected position, and
   each hub including snap fit means for engaging corresponding means on hub covers which fit over the hubs.

21. A structure according to claim 20 in which the hub covers, after engagement with the hubs, define peg receiving means and the rigid members have openings to receive the heads of pegs which join and lock a rigid member to the end of a unit.

22. A structure according to claim 20 in which the snap fit means comprise a pair of resiliently spaced lugs extending outwardly from each hub, these lugs having detents, corresponding lugs being provided on the hub covers with corresponding detents which engage with, and are a snap fit with, the detents on the lugs on the hubs.

23. A portable display structure comprising:
   a number of upright columns,
   a number of horizontally extending beams joining said upright columns to form said display structure,
   the columns and beams being formed in a similar manner and comprising a central structural member made of a number of units, each unit comprising a plurality of rod elements having ends, and associated hubs to which the rod ends are connected, at least some of the hubs being located in the corners of rectangular sections when the units are erected, the units being transportable in a flat configuration, the structural member when in its erected position defining a longitudinally extending unit having a cross section corresponding to the said rectangular section and at each end having an end face,
   nodes of rectangular parallelopiped shape defined by the columns and beams where they join, the columns and beams extending away from the nodes, said end face of a column or beam of said upright columns and horizontally extending beams forming a face of said nodes, said end face being in the form of a rigid member which assists in holding the respective central structural member in its erected position, and
   rigid frames comprising corner clamps adapted to be quickly and detachably fitted to the hubs of a beam or column and a rigid frame member to the corners of which the clamps are attached.

24. A structure according to claim 23 wherein the clamps include means for releasably attaching one clamp to another, the joining of a clamp of one rigid frame joining to a clamp of another, assembling the frames to form the nodes.

25. A structure according to claim 24 wherein the means for releasably attaching comprise a pair of spaced ring members on one clamp and a hook on an adjacent clamp capable of being received between the pair of ring members, and pin means passing through the pair of ring members for securing the hook in place between the pair of ring members.

26. A structural member for a portable display system comprising:
   a number of units, each unit comprising a plurality of rod elements having ends and associated hubs to which the rod ends are connected, at least some of the hubs being located in corners of rectangular sections when the units are erected, the units being transportable in a flat configuration, the structural member when in its erected position defining a longitudinally extending beam having a cross section corresponding to the said rectangular section and having ends;
   means at the hubs for engaging with corresponding means on longitudinally extending corner members to enable the corner members to be quickly mounted and demounted onto the hubs;
   said corner members having integral flanges each extending away from a respective hub in a direction of an edge of the said rectangular section, the flanges defining a number of flat planes corresponding to the edges of the said rectangular section, side panels adhering to said flanges to clothe the column so that the rod elements are hidden, and tie members which join pairs of adjacent corners of the hubs corresponding to the rectangular section at at least one end of said beam for holding the beam in its erected position, said tie members comprising corner clamps adapted to be quickly and detachably fitted to the hubs and a rigid frame member to the corners of which the clamps are attached.

27. A member according to claim 26 wherein the clamps include means for releasably attaching one clamp to another, the joining of a clamp of one rigid frame joining to a clamp of another, assembling the frames to form the nodes.

28. A member according to claim 27 in which the means for releasably attaching comprise a pair of spaced ring members on one clamp and a hook on an adjacent clamp capable of being received between the pair of ring members, and pin means passing through the pair of ring members for securing the hook in place between the pair of ring members.

* * * * *